United States Patent [19]

Feder et al.

[11] Patent Number: 5,973,061
[45] Date of Patent: Oct. 26, 1999

[54] AQUEOUS SILICONE DISPERSIONS CROSSLINKABLE INTO ELASTOMETRIC STATE BY DEHYDRATION

[75] Inventors: Michel Feder, Zillisheim; Jean Ulrich, Saint-Symphorien D'Ozon, both of France

[73] Assignee: Rhone-Poulenc Chimie, Courbevoie Cedex, France

[21] Appl. No.: 07/662,722

[22] Filed: Feb. 28, 1991

Related U.S. Application Data

[63] Continuation of application No. 07/501,264, Mar. 29, 1990, abandoned, which is a continuation-in-part of application No. 07/302,460, Jan. 27, 1989, abandoned.

[30] Foreign Application Priority Data

Aug. 31, 1988 [FR] France ................................. 88 11609

[51] Int. Cl.⁶ ............................ C08L 83/00; C08G 77/06
[52] U.S. Cl. .......................... 524/588; 524/730; 524/731; 524/745; 524/767; 524/784; 524/860; 528/14; 528/23; 528/31; 528/35; 528/37
[58] Field of Search ..................... 524/588, 730, 524/731, 745, 767, 784, 860; 528/14, 23, 31, 35, 37

[56] References Cited

U.S. PATENT DOCUMENTS

| | | | |
|---|---|---|---|
| 4,221,688 | 9/1980 | Johnson et al. | 524/251 |
| 4,244,849 | 1/1981 | Saam | 524/442 |
| 4,554,187 | 11/1985 | Grape et al. | 427/387 |
| 4,590,220 | 5/1986 | Bauman et al. | 521/68 |
| 4,618,645 | 10/1986 | Bauman et al. | 524/745 |
| 4,647,618 | 3/1987 | Bauman et al. | 524/859 |
| 4,661,556 | 4/1987 | Huebner et al. | 524/745 |
| 4,824,877 | 4/1989 | Glover et al. | 523/221 |

*Primary Examiner*—Samuel A. Acquah
*Attorney, Agent, or Firm*—Burns, Doane, Swecker & Mathis, L.L.P.

[57] ABSTRACT

Aqueous silicone dispersions crosslinkable into elastomeric state by elimination of water therefrom, well adapted for the production of elastomer seals, e.g., for the building industry, include:

(A) 100 parts by weight of an oil-in-water emulsion of an $\alpha,\omega$-(dihydroxy)polydiorganosiloxane stabilized with at least one anionic or nonionic surface-active agent, or mixture thereof;

(B) 1 to 100 parts by weight of an hydroxylated silicone resin containing, per molecule, at least two different recurring structural units selected from among those of the formulae: $R_3SiO_{0.5}$, $R_2SiO$, $RSiO_{1.5}$ and $SiO_2$, wherein the radicals R, which may be identical or different, are vinyl, phenyl or 3,3,3-trifluoropropyl radicals, or linear or branched chain alkyl radicals containing from 1 to 6 carbon atoms, said resin having a hydroxyl group weight content of from 0.1% to 10%;

(C) 0 to 250 parts by weight of a nonsiliceous inorganic filler;

(D) 0.01 to 3 parts by weight of a metal curing catalyst compound; and said dispersions having a solids content of at least 40%.

14 Claims, No Drawings

AQUEOUS SILICONE DISPERSIONS CROSSLINKABLE INTO ELASTOMETRIC STATE BY DEHYDRATION

This application is a continuation, of application Ser. No. 07/501,264, filed Mar. 29, 1990, abandoned which is a C.I.P application of application Ser. No. 07/302,460, filed Jan. 27, 1989 abandoned.

BACKGROUND OF THE INVENTION

The present invention relates to an aqueous dispersion based on a silicone resin which is crosslinkable into elastomeric state by eliminating water therefrom.

U.S. Pat. No. 2,891,920 describes a process for the emulsion polymerization of polydiorganosiloxane employing an acidic or basic catalyst in the presence of anionic, cationic or nonionic surface-active agents. This patent relates that the emulsions obtained are stable in storage and, after addition of fillers, can be used to produce paints forming a continuous coating by elimination of water.

U.S. Pat. No. 3,294,725 describes, in particular, the use of dodecylbenzenesulfonic acid for polymerizing polydiorganosiloxanes in emulsion. This patent notes that, in order to obtain stable emulsions, it is desirable to control the pH of these emulsions at a value of approximately 7. The '725 patent discloses that an elastomeric coating can be obtained from these neutralized emulsions, to which colloidal silica and a polyalkoxysilane have been added.

The disclosure of U.S. Pat. No. 3,360,491 is similar to that of U.S. Pat. No. 3,294,725, except that dodecylbenzenesulfonic acid is replaced by lauryl hydrogen sulfate.

U.S. Pat. No. 3,355,406 describes, inter alia, a silicone latex comprising:

(i) a colloidal aqueous suspension of an α,ω-(dihydroxy) polydiorganosiloxane;

(ii) a filler necessarily comprising a silsesquioxane in the form of a colloidal suspension; and (iii) a catalyst selected from among the inorganic acids, strong bases, dialkyltin diacylates and organic or inorganic peroxides.

U.S. Pat. No. 3,697,469 describes a particular process for emulsion polymerization of polydiorganosiloxanes and indicates the possibility of adding colloidal silica and a tin salt to this emulsion in order to obtain an elastomeric coating by evaporation of water.

French Patent FR-A-2,110,358 describes a silicone emulsion having a pH of from 6.5 to 9, crosslinking into an electrically conductive elastomer after evaporation of water by incorporation of carbon black. The emulsion, additionally comprising a tin salt and a polyalkoxysilane, is not stable in storage and must be stored in two separate packages (two-component emulsion).

U.S. Pat. Nos. 4,221,688 and 4,244,849 and French Patent FR-A-2,463,163 describe silicone emulsions which are stable in storage and comprise:

(i) an anionically stabilized emulsion of an α,ω-(dihydroxy)polydiorganosiloxane polymer;

(ii) a siliceous filler;

(iii) a tin salt; and (iv) if desired, a nonreinforcing filler.

The siliceous filler may be a colloidal silica (U.S. Pat. No. 4,221,688), sodium silicate (U.S. Pat. No. 4,244,849), or an amorphous silica in powder form (FR-A-2,463,163).

When compared with the known aqueous emulsions of the prior art, these three patents suggest, on the one hand, that in order to obtain a single-component emulsion which is stable in storage, the emulsion must be maintained at an alkaline pH higher than 8.5 or 9, preferably higher than 10 and, on the other hand, a tin salt must be incorporated in the emulsion to shorten to a few days the emulsion maturing stage required to obtain an emulsion which is capable of crosslinking.

Known filled silicone emulsions, stored at an acidic or neutral pH, exhibit at least one of the following disadvantages:

(a) they are not stable in storage when packaged in a single package (single-component composition);

(b) they require an excessively long time to cure into an elastomer;

(c) they are not thixotropic; and (d) they adhere only very weakly to the usual substrates.

Aqueous emulsions or dispersions based on a silicone resin and capable of crosslinking into an elastomer by elimination of water are already known to this art.

Thus, U.S. Pat. No. 3,355,406, referred to above, describes a silicone latex consisting of an α,ω-(dihydroxy) polydiorganosiloxane, prepared preferably by emulsion polymerization and of a silsesquioxane resin consisting of $RSiO_{1.5}$ units (hydrocarbon R residue). The latex may additionally comprise a metal curing catalyst and an alkyltrialkoxysilane.

In U.S. Pat. No. 4,554,187, the silicone resin associated with the α,ω-(dihydroxy)polydiorganosiloxane is a reactive resin of low molecular weight, containing alkoxy or acyloxy groups.

In published Patent Application EP-A-266,729, the silicone resin associated with the α,ω-(dihydroxy) polydiorganosiloxane and with the curing catalyst is a siliconate.

EP 304,719, published on Mar. 1, 1989, discloses the use, instead of the siliconate, of a silicone resin of high molecular weight, insoluble in toluene and present in the form of an aqueous emulsion in which the particle (micelle) size is greater than 200 nonometers.

A silicone resin comprising up to 10% by weight of hydroxyl group may be associated with this siliconate.

SUMMARY OF THE INVENTION

A major object of the present invention is the provision of an improved aqueous silicone dispersion (emulsion), having an acidic or basic pH, capable of crosslinking into an elastomer by elimination of water therefrom at ambient temperature, and which improved dispersion (emulsion) conspicuously ameliorates or avoids those disadvantages and drawbacks to date characterizing the state of this art.

Another object of the present invention is the provision of an aqueous silicone dispersion of the above type, which is stable in storage and which properly crosslinks, sufficiently quickly, into an elastomer by elimination of water therefrom at ambient temperature, the formed elastomer retaining its mechanical properties upon aging thereof.

Yet another object of the present invention is the provision of an aqueous silicone dispersion of the above type, the maturing stage of which can be carried out at a slightly raised temperature (20°–60° C.) and for a period of time of less than 48 hours.

Still another object of the present invention is the provision of an aqueous silicone dispersion of the above type, crosslinkable into an elastomer additionally exhibiting an improved flame resistance.

Another object of the present invention is the provision of an aqueous silicone dispersion of the above type, crosslinkable into an elastomer exhibiting a satisfactory adhesion to various substrates, particularly to glass, concrete and metals (steel, aluminum, etc.).

Briefly, the present invention features an aqueous silicone dispersion crosslinkable into elastomeric state by elimination of water therefrom under ambient conditions, comprising:

(A) 100 parts by weight of an emulsion of the oil-in-water type of an α,ω-(dihydroxy)polydiorganosiloxane, stabilized with at least one surface-active agent selected from among the anionic and nonionic surface-active agents and mixtures thereof;

(B) 1 to 100 parts by weight of an hydroxylated silicone resin containing, per molecule, at least two different recurring structural units selected from among those of the formulae: $R_3SiO_{0.5}$, $R_2SiO$, $RSiO_{1.5}$ and $SiO_2$, the radicals R, which are identical or different, being vinyl, phenyl or 3,3,3-trifluoropropyl radicals, or linear or branched chain alkyl radicals containing from 1 to 6 carbon atoms inclusive, said resin having a hydroxyl group weight content of from 0.1% to 10%;

(C) 0 to 250 parts by weight of a nonsiliceous inorganic filler;

(D) 0.01 to 3 parts by weight of a metal curing catalyst compound; and said dispersion having a solids content of at least 40%.

DETAILED DESCRIPTION OF THE PREFERRED EMBODIMENTS OF THE INVENTION

More particularly according to the present invention, the α,ω-(dihydroxy)polydiorganosiloxanes must have a viscosity of at least 100 mpa.s at 25° C., preferably at least 50,000 mpa.s.

It is, in fact, at viscosities above 50,000 mPa.s that an elastomer is obtained exhibiting a combination of appropriate mechanical properties, particularly in respect of Shore A hardness and of elongation.

Furthermore, the higher the viscosity, the more the mechanical properties are maintained as the elastomer ages.

The preferred viscosities according to the present invention range from 50,000 to 1,500,000 mpa.s at 25° C.

The organic radicals of the α,ω-(dihydroxy) polydiorganosiloxanes are monovalent hydrocarbon radicals containing up to 6 carbon atoms, optionally substituted by cyano or fluoro groups. The substituents which are generally employed because of their availability in industrial products are methyl, ethyl, propyl, phenyl, vinyl and 3,3,3-trifluoropropyl radicals. At least 80% of the number of these radicals are generally methyl radicals.

Consistent herewith, it is more especially preferred to employ the α,ω-(dihydroxy)polydiorganosiloxanes prepared by the anionic polymerization process described in the aforementioned U.S. Pat. No. 2,891,920 and, in particular, U.S. Pat. No. 3,294,725, hereby incorporated by reference). The polymer obtained is stabilized anionically with a surface-active agent which, in accordance with U.S. Pat. No. 3,294,725, is preferably an alkali metal salt of an aromatic hydrocarbon sulfonic acid, the free acid also serving as a polymerization catalyst.

The preferred catalyst and surface-active agent are dodecylbenzenesulfonic acid and its alkali metal salts, especially its sodium salt. If desired, other anionic or nonionic surface-active agents may be added. However, this addition is not necessary because, in accordance with the disclosure of U.S. Pat. No. 3,294,725, the amount of anionic surface-active agent resulting from the neutralization of the sulfonic acid is sufficient to stabilize the polymer emulsion. This amount is generally less than 3%, preferably 1.5% of the weight of the emulsion.

This emulsion polymerization process is particularly advantageous because it makes it possible to directly produce the emulsion (A). Furthermore, this process enables α,ω-(dihydroxy)polydiorganosiloxane emulsions (A) of very high viscosity to be potentially obtained without difficulty.

To prepare the emulsion (A), it is also possible to start with an already polymerized α,ω-(dihydroxy) polydiorganosiloxane, and to then convert it into an aqueous emulsion by stabilizing the emulsions with an anionic and/or nonionic surface-active agent according to well known techniques, described in detail in the literature (see, for example, Patents FR-A-2,064,563, FR-A-2,094,322, FR-A-2,114,230 and EP-A-169,098).

According to this process, the α,ω-(dihydroxy) polydiorganosiloxane polymers are mixed simply by stirring them with the anionic or nonionic surface-active agent, it being possible for the latter to be in aqueous solution. Then water is added, if necessary, and the entire mass is converted into a fine and homogeneous emulsion by passing it through a conventional colloid mill.

The millbase obtained is subsequently diluted with a suitable amount of water and an emulsion (A) stabilized with an anionic or nonionic surface-active agent and stable in storage is thus obtained.

The amount of anionic and nonionic surface-active agent which can be employed is that commonly employed in the emulsification process, particularly those described in the abovementioned patents and in U.S. Pat. No. 2,891,920.

According to the present invention, the preferred anionic surface-active agents are the alkali metal salts of an aromatic hydrocarbon sulfonic acid and the preferred nonionic surface-active agents are polyoxyethylenated alkylphenols. These nonionic surface-active agents are obviously the same as those which may be added, if desired, to the emulsions (A) obtained by emulsion polymerization as indicated above.

The emulsion (A) prepared by emulsion polymerization, or by emulsifying the silicone polymer, is in the form of an oil-in-water emulsion and preferably has a solids content of more than 45% by weight.

From 1 to 100 parts by weight, preferably from 2 to 20 parts, calculated on a solids content basis, of a hydroxylated silicone resin (B) are incorporated per 100 parts by weight of emulsion (A).

The hydroxylated silicone resin (B) has a hydroxyl group weight content of from 0.1% to 10%, preferably from 1% to 6%.

This resin (B) contains, per molecule, at least two different structural units selected from among those of the formulae: $R_3SiO_{0.5}$ (M unit), $R_2SiO$ (D unit), $RSiO_{1.5}$ (T unit) and $SiO_2$ (Q unit).

Methyl, ethyl, isopropyl, tert-butyl and n-hexyl radicals are exemplary of the alkyl radicals R.

These silicone resins are well known branched organopolysiloxane polymers, the preparation of which is described in very many patents.

MQ resins, MDQ resins, TD resins and MDT resins are exemplary of the resins which can be used.

Resins which are solid or liquid at ambient temperature may be employed. These resins may be incorporated in aqueous emulsions as such, in solution in an organic solvent or a silicone oil, or else in the form of aqueous emulsions.

It is recommended to employ liquid or solid silicone resins having preferably a relatively low average molecular weight generally below 25,000, and generally above 500, soluble in toluene like certain resins of the MQ, MDQ, TD and MDT type.

Contrary to the disclosure of EP 304,719, the silicone resins can be employed as such without being emulsified beforehand or without being necessarily prepared beforehand by emulsion polymerization. In addition, the aqueous emulsions of these resins do not necessarily need to have a particle size of at least 200 nonometers as suggested by EP 304,719.

Aqueous emulsions of silicone resins which can be used are described, for example, in U.S. Pat. Nos. 4,028,339, 4,052,331, 4,056,492, 4,525,502 and 4,717,599, hereby incorporated by reference.

Another constituent of the dispersion according to the invention is the addition of 0 to 250, preferably of 5 to 200, parts by weight of a semireinforcing or packing nonsiliceous inorganic filler (C).

The fillers (C) have a particle size which generally ranges from 1 to 300 $\mu$m and a BET surface area of less than 50 m$^2$/g.

Examples of the fillers (C) which can be used by themselves, or in admixture, are carbon black, titanium dioxide, aluminum oxide, hydrated alumina, expanded vermiculite, unexpanded vermiculite, calcium carbonate, zinc oxide, mica, talc, iron oxide, barium sulfate and slaked lime.

These fillers (C) are introduced into the emulsion (A) in the form of a dry powder, for example simply by mixing.

In one embodiment of the invention, it has been found that if the filler (C) consists substantially only of a filler selected from among hydrated alumina, expanded vermiculite and unexpanded vermiculite in a proportion of 5 to 250, preferably of 50 to 200, parts by weight per 100 parts by weight of emulsion (A), an elastomer is produced which has a particularly high flame resistance which cannot be obtained with the other categories of filler (C) mentioned above, particularly with aluminum oxide or unhydrated alumina. Ceramic or aramide fibers may also be incorporated according to EP-A-212,827.

The metal curing catalyst compounds (D) are essentially carboxylic acid salts and halides of such metals as lead, zinc, zirconium, titanium, iron, tin, barium, calcium and manganese.

The constituent (D) is preferably a catalytic tin compound, generally an organotin salt, preferably introduced in the form of an aqueous emulsion. The organotin salts which can be used are described particularly in the text by Noll, *Chemistry and Technology of Silicones*, page 337, Academic Press (1968).

The reaction product of a tin salt, particularly of a tin dicarboxylate with ethyl polysilicate, as described in U.S. Pat. No. 3,862,919, may also be used as a catalytic tin compound.

It is also possible to employ the reaction product of an alkyl silicate or of an alkyltrialkoxysilane with dibutyltin diacetate, as described in Belgian Patent BE-A-842,305.

The preferred tin salts are tin bischelates (EP-A-147,323 and EP-A-235,049), diorganotin dicarboxylates and, in particular, dibutyl- or dioctyltin diversatates (British Patent GB-A-1,289,900), dibutyl- or dioctyltin diacetate, and dibutyl- or dioctyltin dilaurate. From 0.01 to 3, preferably from 0.05 to 2, parts of organotin salt are employed per 100 parts of (A).

In an alternative embodiment of the invention, a siliceous additive (E) selected from among sodium silicate (0.3 to 30 parts) and a reinforcing or semireinforcing siliceous filler (1 to 150 parts) may be incorporated, per 100 parts of emulsion (A).

These siliceous fillers are selected from among colloidal silica or pyrogenic and precipitated silica powders or a mixture thereof. Pyrogenic silica is preferred. However, semireinforcing siliceous fillers such as diatomaceous earths and ground quartz may also be employed.

The sum of the parts of (C)+(E) must be less than 300 parts per 100 parts of emulsion (A).

Pyrogenic and precipitated silica powders are well known to this art; they are employed particularly as fillers in silicone elastomer compositions which can be vulcanized into a silicone rubber by heating. These powders have a mean particle size which is generally below 0.1 $\mu$m and a BET specific surface area higher than 50 m$^2$/g, preferably ranging from 150 to 350 m$^2$/g.

The incorporation of this siliceous additive (E) in the emulsion (E) by any suitable means, particularly by stirring, greatly increases the viscosity of the emulsion (A), which then appears pasty in nature.

It has now surprisingly been found according to the present invention that the addition of this siliceous additive (E) is sufficient to impart a more or less marked "thixotropic" character to the dispersion. The emulsion, for example when extracted from a storage cartridge, adheres even to a vertical substrate without running and cures into an elastomer by evaporation of water at ambient temperature. An emulsion which does not flow can also be obtained by using as filler (C) calcium carbonate, the mean particle diameter of which is less than 0.1 $\mu$m. Obviously, slight heating (to approximately 40–80° C.) of the composition to accelerate the evaporation of water is within the ambit of the invention.

Various additives enabling the properties of emulsions and of the elastomers formed from the emulsions by elimination of water to be modified may be added to the dispersions in accordance with the present invention. It is possible to incorporate adhesion promoters (F), preferably organotrialkoxysilanes such as, for example, vinyltrimethoxysilane, alkyl silicates such as methyl silicate or ethyl silicate or a product of their partial hydrolysis, namely, alkyl polysilicates such as methyl polysilicate and ethyl polysilicate, in a proportion of 0.1 to 20 parts of adhesion promoter per 100 parts of emulsions (A).

The organotrialkoxysilanes and alkyl silicates preferably correspond to the general formula:

$$R'_a Si (OR)_{4-a}$$

in which R is an alkyl radical containing from 1 to 4 carbon atoms, R' is R or vinyl and a is 1 or 0.

The dispersions according to the invention have a pH value which generally ranges from 4 to 13. This value depends on the nature of the ingredients constituting the dispersion, in particular on the level of the surfactant and of the catalyst in the emulsion (A) and on the level of the filler (C).

Depending on the applications which are envisaged, dispersions which have a pH of from 4 to 7 may be prepared by adding an inorganic or organic acid, preferably an oxygenated boron derivative, and dispersions which have a pH of from 7 to 13 by adding an inorganic or organic base, as described in greater detail below.

Other examples of additives which may be mentioned are fungicides and foam suppressors, as well as thixotropic agents such as carboxymethyl cellulose, xanthan gum and polyvinyl alcohol.

The dispersions according to the invention may be employed, more particularly in the building industry, for producing caulking and seals.

The dispersions according to the invention may be prepared in the following manner:

The starting material is an emulsion (A) prepared either by the emulsion polymerization process, whereby an emulsion stabilized by an anionic and, if desired, nonionic surface-active agent is produced, or by the process of emulsifying the α,ω-(dihydroxy)polydiorganosiloxane, whereby an emulsion stabilized with an anionic and/or nonionic surface-active agent is also produced.

To prepare the dispersions according to the invention it is recommended to first add the metal cure catalyst compound (D), preferably in the form of an aqueous emulsion, to the emulsion (A) at ambient temperature, and then the pH of the mixture is adjusted to a value above 7 and generally below 13, by means of an inorganic or organic base, preferably by means of an alkali metal hydroxide such as sodium hydroxide and potassium hydroxide, or to a value below 7 and above 4, by adding an appropriate amount of an oxygenated boron derivative selected from among boric oxide, boric acids and borates.

Primary amines such as diethylamine may be employed as an organic base. However, in a preferred embodiment of the invention, the pH is adjusted by means of an appropriate amount of an inorganic base introduced in the form of an aqueous solution preferably selected from among solutions of alkali metal and alkaline earth metal hydroxides such as sodium hydroxide, potassium hydroxide, and solutions of calcium hydroxide, barium hydroxide and magnesium hydroxide. However, the alkaline earth metal hydroxides may be directly introduced, in a solid form.

Boric oxide is also known as boric anhydride. Orthoboric acid, metaboric acid and tetraboric acid are representative boric acids. Triorganoborates and inorganic borates can be employed as borates. Triethyl borate, 1,r triphenyl borate, tribenzyl borate, tricyclohexyl borate, trimethylsilyl borate, tri(t-butyl) borate, diammonium tetraborate, ammonium pentaborate, sodium tetraborate decahydrate (borax), potassium pentaborate, magnesium diborate, calcium monoborate, barium triborate and zinc metaborate can be used according to the present invention. The products of partial hydrolysis of these borates may also be employed.

To adjust the final pH of the dispersion to a value of between 4 and 7, it is generally sufficient to add to the dispersion from 0.1 to 5 parts of an oxygenated boron derivative per 100 parts of emulsion (A).

The fillers (C) and, if desired (E), are added, followed by the resin (B) as such, or in solution in an organic solvent or in a silicone oil, or else in the form of an aqueous emulsion.

A trimethylsilyl-blocked polydimethylsiloxane having a viscosity of from 100 to 5,000 mpa.s at 25° C. may be employed as a silicone oil.

The final emulsion is homogenized and then degassed and is subsequently packaged in a package which is impervious to atmospheric oxygen and to water vapor.

The constituents (A), (B), (C), (D) and, if desired, (E) and (F) are mixed in such quantities that the final emulsion has a solids content of more than 40%, preferably more than 60%, but generally below 90%.

The dispersions according to the invention may be employed as a paint capable of crosslinking as a thin layer. They then preferably have a solids content of from 40 to 70%.

To determine the solids content, 2 g of dispersion are placed in an aluminum weighing dish and this is heated for one hour to 150° C. in an oven with air circulation. After cooling, the dish is reweighed and the residual material is determined as a percentage of the initial 2 g, representing the solids content.

In a preferred alternative embodiment of the invention, after being prepared, the dispersion according to the invention is subjected to a maturing stage at ambient temperature or at a temperature of from 20° to 90° C. for a few hours to a few days.

This maturing or aging stage entails simple heating, if desired, and allowing the dispersion to stand in the absence of atmospheric oxygen before-use.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

Preparation of the emulsion (A): this was produced by emulsion polymerization of α,ω-(dihydroxy) polydimethylsiloxane oil having a viscosity of 100 mpa.s at 25° C. in the presence of dodecylbenzenesulfonic acid.

When the viscosity of the oil reached $10^6$ mpa.s at 25° C., the polymerization was terminated by neutralizing the catalyst.

The emulsion (A) obtained had a solids content of 59%.

1.5 parts of aqueous emulsion (D) containing 37% by weight of dioctyltin dilaurate were added to 100 parts of emulsion (A) under stirring. 1.2 parts of diethylamine and 60 parts of filler (C), which was precipitated $CaCO_3$ having a mean particle size of 0.07 μm were then added.

8.3 parts of a hydroxylated silicone resin (B), containing 1% by weight of hydroxyl groups and consisting of 2% by weight of $CH_3SiO_{1.5}$ unit, 61.5% by weight of $(CH_3)_2SiO$ unit and 36.5% by weight of $(CH_3)_3SiO_{0.5}$ unit were added, as such, to the emulsion obtained.

The final dispersion obtained had a pH of 9.5.

It was homogenized for 30 minutes and was then packaged in a package which was impervious to atmospheric oxygen and to water vapor.

After 4 days of storage, the dispersion was spread with a doctor blade to form a film 2 mm in thickness, which was permitted to dry for 7 days at ambient temperature.

The following average mechanical properties were measured on the dried films:
  (i) the Shore A hardness (SAH) according to ASTM standard D 2240;
  (ii) the tensile strength (TS) according to AFNOR standard T 46 002 corresponding to ASTM standard D 412, in MPa;
  (iii) the elongation at break (EB) in % according to AFNOR standard T 46 002;
  (iv) the elasticity modulus (EM) at 100% elongation according to AFNOR standard T 46 002, in MPa.

The mechanical properties obtained are reported in Table 1 below.

EXAMPLES 2 TO 3

The operating procedure of Example 1 was repeated precisely, except that the 8.3 parts of resin (B) were replaced with:

(a) in the case of Example 2: 8.8 parts, introduced as such, of a resin containing 2.2% by weight of hydroxyl group, consisting of 70% by weight of $CH_3SiO_{1.5}$ unit and 30% by weight of $(CH_3)_2SiO$ unit. The final emulsion obtained had a pH of 8.5;

(b) in the case of Example 3: 4.1 parts, introduced by means of a solution containing 70% by weight in toluene, of a resin containing 2.2% by weight of hydroxyl and consisting of 73% by weight of $C_6H_5SiO_{1.5}$ unit and 27% by weight of $(CH_3)_2SiO$ unit. The final emulsion obtained had a pH of 8.5.

The mechanical properties are also reported in Table 1 below.

TABLE 1

| EXAMPLES | 1 | 2 | 3 |
|---|---|---|---|
| SAH | 13 | 16 | 10 |
| TS (MPa) | 1.27 | 1.36 | 1.38 |
| EB (%) | 1,021 | 1,020 | 1,306 |
| EM (MPa) | 0.17 | 0.20 | 0.12 |

EXAMPLES 4 TO 6

The operating procedure of Example 1 was repeated precisely, except that the 1.2 parts of diethylamine were replaced with:

(a) in the case of Example 4: 4 parts of an aqueous solution containing 20% of potassium hydroxide. The final emulsion had a pH of 11;

(b) in the case of Example 5: 4 parts of a solution containing 20% of potassium hydroxide and 0.5 part of ethyl polysilicate (ethyl silicate 40. The pH was 11;

(c) in the case of Example 6: 4 parts of a solution containing 20% of potassium hydroxide and 1 part of ethyl polysilicate. The pH was 11.

1 strand, 4 mm in thickness, was deposited onto a glass or concrete substrate. After 10 days, the adhesion of the elastomer was assessed by pulling the strand manually.

The adhesions have been qualified in three ways:

(1) good adhesion when the strand cannot be separated from its substrate (marked ++), (2) average adhesion when the strand peels off with difficulty and in small areas (marked +), (3) absence of adhesion when the strand peels off easily marked 0).

The mechanical properties and the assessments of adhesion are reported in Table 2 below.

TABLE 2

| EXAMPLES | 4 | 5 | 6 |
|---|---|---|---|
| SAH | 15 | 23 | 27 |
| TS (MPa) | 1.76 | 1.2 | 1.67 |
| EB (%) | 986 | 730 | 704 |
| EM (MPa) | 0.19 | 0.29 | 0.45 |
| Glass adhesion | + | ++ | ++ |
| Concrete adhesion | + | + | + |

EXAMPLE 7

The operating procedure of Example 1 was repeated, except for the following replacements:

(a) the 8.8 parts of MDT resin with 7 parts of an MQ resin in solution in toluene, which had 2% by weight of hydroxyl and consisted of 50% by weight of M unit and 50% by weight of Q unit, and (b) the 1.2 parts of diethylamine with 4 parts of a solution containing 20% by weight of potassium hydroxide.

The mechanical properties obtained and the assessment of adhesion are reported in Table 3 below.

EXAMPLE 8

The operating procedure of Example 7 was repeated and, in addition, 1 part of ethyl polysilicate (ethyl silicate 40, was added.

The mechanical properties obtained and the assessment of adhesion are reported in Table 3 below.

EXAMPLE 9

The operating procedure of Example 2 was repeated precisely, except that:

(a) the 1.2 parts of diethylamine were replaced with 0.59 part of boric acid, (b) the 1.5 parts of catalyzing emulsion (D) were replaced with 1.5 parts of catalyzing emulsion containing 37% by weight of a tin compound which was the reaction product of one mole of dioctyltin oxide with one mole of versatic acid® with elimination of the water formed, (c) a maturing stage of 2 hours, 30 minutes, at 80° C. was carried out on the dispersion obtained before the dispersion was packaged in a sealed package.

The mechanical properties obtained are reported in Table 3 below.

TABLE 3

| EXAMPLES | 7 | 8 | 9 |
|---|---|---|---|
| SAH | 7 | 13 | 16 |
| TS | 0.9 | 0.36 | 1.04 |
| EB | 1,377 | 680 | 1,010 |
| EM | 0.15 | 0.2 | 0.19 |
| Glass adhesion | ++ | ++ | − |
| Concrete adhesion | + | ++ | − |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous silicone dispersion crosslinkable into elastomeric state by elimination of water therefrom under ambient conditions, comprising:

(A) 100 parts by weight of an oil-in-water emulsion of an α,ω-(dihydroxy)polydiorganosiloxane stabilized with at least one anionic or nonionic surface-active agent, or mixture thereof;

(B) 1 to 100 parts by weight of an hydroxylated silicone resin containing, per molecule, at least two different recurring structural units selected from among those of the formulae: $(R)_3SiO_{0.5}$, $(R)_2SiO$, $RSiO_{1.5}$ and $SiO_2$, wherein the radicals R, which may be identical or different, are vinyl, phenyl or 3,3,3,-trifluoropropyl radicals or linear or branched chain alkyl radicals containing from 1 to 6 carbon atoms, said resin having a hydroxyl group weight content of from 0.1% to 10%;

(C) 0 to 250 parts by weight of a nonsiliceous inorganic filler;

(D) 0.01 to 3 parts by weight of a metal curing catalyst compound; and said dispersion having a solids content of at least 40%.

2. The aqueous silicone dispersion as defined by claim 1, wherein the resin is a MQ, MDQ, TD, or MDT resin.

3. The aqueous silicone dispersion as defined by claim 1, wherein the resin (B) comprises a toluene-soluble liquid or solid resin with an average molecular mass below about 25,000 and above about 500.

4. The aqueous silicone dispersion as defined by claim 1, wherein the metal compound (D) comprises an aqueous emulsion of an organotin salt.

5. The aqueous silicone dispersion as defined by claim 1, wherein the emulsion (A) has a solids content of at least 45% by weight.

6. The aqueous silicone dispersion as defined by claim 1, comprising from 5 to 200 parts by weight of filler (C) selected from among hydrated alumina, alumina, calcium carbonate, expanded vermiculite, unexpanded vermiculite, carbon black, zinc oxide, titanium dioxide, mica, talc, iron oxide, barium sulfate and slaked lime.

7. The aqueous silicone dispersion as defined by claim 6, said filler (C) comprising calcium carbonate having a mean particle diameter of less than 0.1 μm.

8. The aqueous silicone dispersion as defined by claim 1, comprising:

(A) 100 parts of an oil-in-water emulsion of an α,ω-(dihydroxy)polydiorganosiloxane having a viscosity at 25° C. of from 50,000 to 1,500,000 mpa.s and stabilized with a surface-active agent which comprises an alkali metal salt of an aromatic hydrocarbon sulfonic acid or a polyoxyethylenated alkylphenol;

(B) 2 to 20 parts of an hydroxylated silicone resin;

(C) 50 to 200 parts of an inorganic filler;

(D) 0.05 to 2 parts of a diorganotin dicarboxylate; and said emulsion having a solids content of at least 60%.

9. The aqueous silicone dispersion as defined by claim 1, further comprising, per 100 parts of the emulsion (A), a siliceous additive (E) which comprises from 0.3 to 30 parts of sodium silicate, or from 1 to 150 parts of a reinforcing or semireinforcing siliceous filler, with the proviso that the sum of the parts of (C)+(E) is less than 300 parts per 100 parts of (A).

10. The aqueous silicone dispersion as defined by claim 1, further comprising from 0.01 to 20 parts by weight of an adhesion promoter (F) which comprises an organotrialkoxysilane, alkyl silicate or alkyl polysilicate.

11. The aqueous silicone dispersion as defined by claim 1, further comprising from 0.1 to 5 parts of an oxygenated boron compound per 100 parts of emulsion (A).

12. The aqueous silicone dispersion as defined by claim 1, having a pH ranging from 4 to 7.

13. The aqueous silicone dispersion as defined by claim 1, having a pH ranging from 7 to 13.

14. The dispersion as defined by claim 1, in anhydrous, crosslinked elastomeric state.

* * * * *